United States Patent [19]

Bunn

[11] Patent Number: 5,452,086
[45] Date of Patent: Sep. 19, 1995

[54] INTERFEROMETER AMPLITUDE MODULATION REDUCTION CIRCUIT

[75] Inventor: James B. Bunn, Los Angeles County, Calif.

[73] Assignee: Litton Systems, Inc., Woodland Hills, Calif.

[21] Appl. No.: 34,036

[22] Filed: Mar. 22, 1993

[51] Int. Cl.6 .................. G01B 9/02; G01C 19/64
[52] U.S. Cl. .................... 356/345; 356/350; 356/346; 250/227.12
[58] Field of Search .......... 356/345, 346, 352, 350, 356/349; 250/227.27, 227.12, 227.19

[56] References Cited

U.S. PATENT DOCUMENTS

| | | | |
|---|---|---|---|
| 3,699,463 | 10/1972 | Stone | 359/183 |
| 4,872,754 | 10/1989 | Ensley | 356/350 |
| 4,883,358 | 11/1989 | Okada | 356/350 |
| 4,998,295 | 3/1991 | Siegel | 356/345 |
| 5,062,153 | 10/1991 | Turpin et al. | 250/227.17 |
| 5,166,988 | 11/1992 | Bobb et al. | 356/345 |
| 5,245,461 | 9/1993 | Fitzmartin | 250/227.12 |
| 5,283,625 | 2/1994 | Bunn, Jr. | 356/345 |
| 5,321,503 | 6/1994 | Bramson | 356/350 |

FOREIGN PATENT DOCUMENTS 2209221 8/1988 United Kingdom .

OTHER PUBLICATIONS

IEEE, "Homodyne Demodulation Scheme for Fiber Optic Sensors Using Phase Generated Carrier" Dandridge et al. Apr. 1, 1982.

*Primary Examiner*—Rolf Hille
*Assistant Examiner*—Alexander Oscar Williams
*Attorney, Agent, or Firm*—James F. Kirk; Chester E. Martine, Jr.

[57] ABSTRACT

An interferometer amplitude modulation reduction circuit coupled to receive an interferometer output signal from the output of a fiber optic interferometer sensor. The interferometer sensor is excited by a frequency modulated input light signal from a light source having an unwanted amplitude modulation and intensity noise signal component. The interferometer output signal has both wanted interference induced intensity modulation and also unwanted amplitude modulation and intensity noise from the unwanted amplitude modulation and intensity noise signal components present on the frequency modulated input light signal. The invention circuit has a sampling means for sampling a sample portion of the frequency modulated input light signal from the output of the light source. The sampling means detects and the sample portion signal to provide a detected sample intensity signal having a detected unwanted amplitude modulation and intensity noise signal component. A detector detects the interferometer output signal from the output of the fiber optic interferometer sensor and converts the interferometer output signal into a detected AM modulated phase-generated carrier signal containing a detected unwanted amplitude modulation and intensity noise signal component. A divider scales and divides the detected AM modulated phase-generated carrier signal by the detected sample intensity signal to provide a corrected interferometer output signal. The detected unwanted amplitude modulation and intensity noise signal components common to both the detected sample intensity signal and the detected AM modulated phase-generated carrier signal are substantially canceled by the division process.

20 Claims, 7 Drawing Sheets

INTERFEROMETER AMPLITUDE MODULATION REDUCTION CIRCUIT

BACKGROUND OF INVENTION

1. Field of Invention

This invention relates to the field of optical interferometric sensors such as Mach-Zehnder and Michelson interferometers used in optical hydrophones using a frequency modulated laser light source and more particularly to the field of apparatus and circuits for reducing or eliminating the effects of unwanted laser intensity modulation that results from laser frequency modulation.

2. Description of Related Art

This invention relates to apparatus and circuits used in the field of interferometric sensors that respond to perturbations such as acoustic wavefronts by producing a phase difference in two light beams propagated by fiber optic material. More particularly, this invention relates to those apparatus and circuits used to recover the acoustic input signal from the signal developed by the optical fiber interferometer used to sense the acoustic energy.

A fiber optic Mach-Zehnder interferometer typically has a reference arm comprising a first length of optical fiber and a sensing coil or arm comprising a second length of optical fiber. The sensing arm is exposed to a physical disturbance, such as an acoustical wavefront while the reference arm is isolated from the wave front.

An optical coupler divides a light signal between the arms. The signals are recombined after they have traveled the length of the reference and sensing arms at which time the light signals interfere and it becomes possible to measure the phase difference between the signals.

Authors A. Dandridge et al published a paper titled "Homodyne Demodulation Scheme for Fiber Optic Sensors Using Phase Generated Carrier" in the IEEE Journal of Quantum Electronics, Vol QE-18, No. 10 in October 1982 that discussed a process for extracting information from the interference signal produced by a fiber optic hydrophone.

British patent 2,209,221 titled "Hydrophone Demodulator Circuit and Method" issued Oct. 23, 1991 and the innovation taught in U.S. patent application Ser. No. 07/751,358, filed Aug. 19, 1991 for an "Interferometer Phase Modulation Controller", which issued as U.S. Pat. No. 5,283,625 on Feb. 1, 1994, both to J. Bunn et al and having a common assignee, Litton Systems Inc., and which U.S. patent is incorporated herein by reference, expanded on the concepts of the Dandridge 1982 paper. These papers show the type of demodulation scheme that can be used to process the signal that is made available by the invention interferometer amplitude modulation reduction apparatus and circuit.

SUMMARY OF INVENTION

An interferometer amplitude modulation reduction apparatus and circuit is provided that is coupled to receive an interferometer output signal from the output of an interferometric sensor such as a Mach-Zehnder interferometer.

The interferometer sensor is excited by a frequency modulated input light signal from a light source having an unwanted amplitude modulation and intensity noise signal component. The interferometer output signal has wanted interference induced intensity modulation and unwanted amplitude modulation and intensity noise from the unwanted amplitude modulation and intensity noise signal component present on the frequency modulated input light signal.

In a first alternative embodiment, the invention amplitude modulation reduction apparatus comprising a sampling means 54 for sampling a sample portion of the frequency modulated input light signal from the output of the light source. The sample is called a sample portion signal. In this first embodiment, the sampling means 54 also detects and converts the sample portion signal into a detected sample intensity signal having a detected unwanted amplitude modulation and intensity noise signal component.

A first detection means 56, such as a photo-diode and a preamplifier, detects the interferometer output signal from the output of the interferometric sensor and converts the interferometer output signal into a detected AM modulated phase-generated carrier signal that contains a detected unwanted amplitude modulation and intensity noise signal component in addition to the interference information which contains the signal of interest.

A division means, such as an analog divider integrated circuit, scales and divides the detected AM modulated phase-generated carrier signal by the detected sample intensity signal to provide a corrected interferometer output signal.

The detected unwanted amplitude modulation and intensity noise signal components common to both the detected sample intensity signal and the detected AM modulated phase-generated carrier signal are substantially canceled by the division process. The corrected interferometer output signal is substantially free of the detected unwanted amplitude modulation and intensity noise signal component.

In a more particular embodiment, the invention amplitude modulation reduction circuit is used in a frequency modulated interferometer signal detection system with reduced signal amplitude modulation and signal intensity noise. The frequency modulated interferometer signal detection system has a laser diode light source that provides a frequency modulated light signal that has an unwanted amplitude modulation and intensity noise signal component. This undesired amplitude modulation is a by-product of the laser frequency modulation process.

An interferometric sensor has an input port for receiving the frequency modulated input light signal from the light source and an output port that provides an interferometer output signal. The interferometer output signal has wanted interference induced intensity modulation and unwanted amplitude modulation and intensity noise from the unwanted amplitude modulation and intensity noise signal component present on the frequency modulated input light signal from the light source.

A coupling means formed from a coupler, or a beam splitter, has at least an input port and first and second output ports. The input port is coupled to receive the frequency modulated input light signal. The optical coupler coupling a major portion of the frequency modulated input light signal from the input port to the first output port and a small portion of the frequency modulated input light signal to the second output port 66 as the sample portion signal.

A first detection means, such as a photo-diode and preamplifier detects the interferometer output signal from the output of the interferometric sensor and converts the interferometer output intensity signal into a detected AM modulated phase-generated carrier signal voltage containing a detected unwanted amplitude modulation and intensity noise signal component as well as the interference waveform.

A second detection means, such as a photo-diode and preamplifier, is coupled to receive and for convert the sample portion signal into a detected sample voltage signal proportional to the laser output intensity.

A division means has a first signal input coupled to receive the detected AM modulated phase-generated carrier signal and scale and divide the detected AM modulated phase-generated carrier signal by the detected sample intensity signal to provide a corrected, or normalized interferometer output signal.

The detected unwanted amplitude modulation and intensity noise signal components common to both the detected sample intensity signal and the detected AM modulated phase-generated carrier signal are substantially canceled by the division process. The corrected interferometer output signal that results is substantially free of the detected unwanted amplitude modulation and intensity noise signal component.

DESCRIPTION OF THE PREFERRED EMBODIMENT

Figure 1:
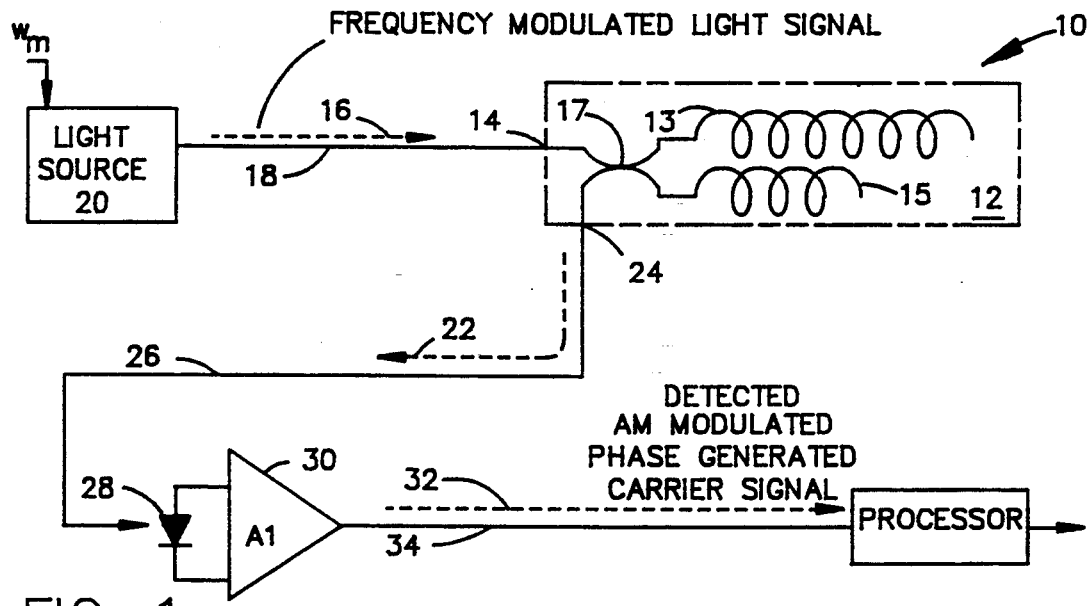
FIG. 1 is a schematic block diagram of a typical interferometer system using a Michelson interferometer, such as might be used in sensing hydrophone signals.

FIG. 1 shows a typical interferometer apparatus arrangement 10 in which the interferometer 12 has a sense arm 13, a reference arm 15 and an optical input 14 for receiving a frequency modulated light signal represented by phantom ray 16 via optical fiber or optical wave guide 18 from a light source 20 such as a laser light source. A first interferometer optical coupler 17 optionally connects the sense arm and reference arm to the input and output ports 13, 15. The laser light source 20 is frequency modulated by modulation current input $w_m$. The interferometer 12 provides an optical interferometer output signal represented by phantom ray 22 from the interferometer output port 24 via optical waveguide or fiber optic fiber 26 to a first detector 28 for amplification by pre-amplifier 30 to provide a detected AM modulated phase-generated carrier signal represented by ray 32 via optical fiber or wave guide 34 to a processor 36.

Figure 2:
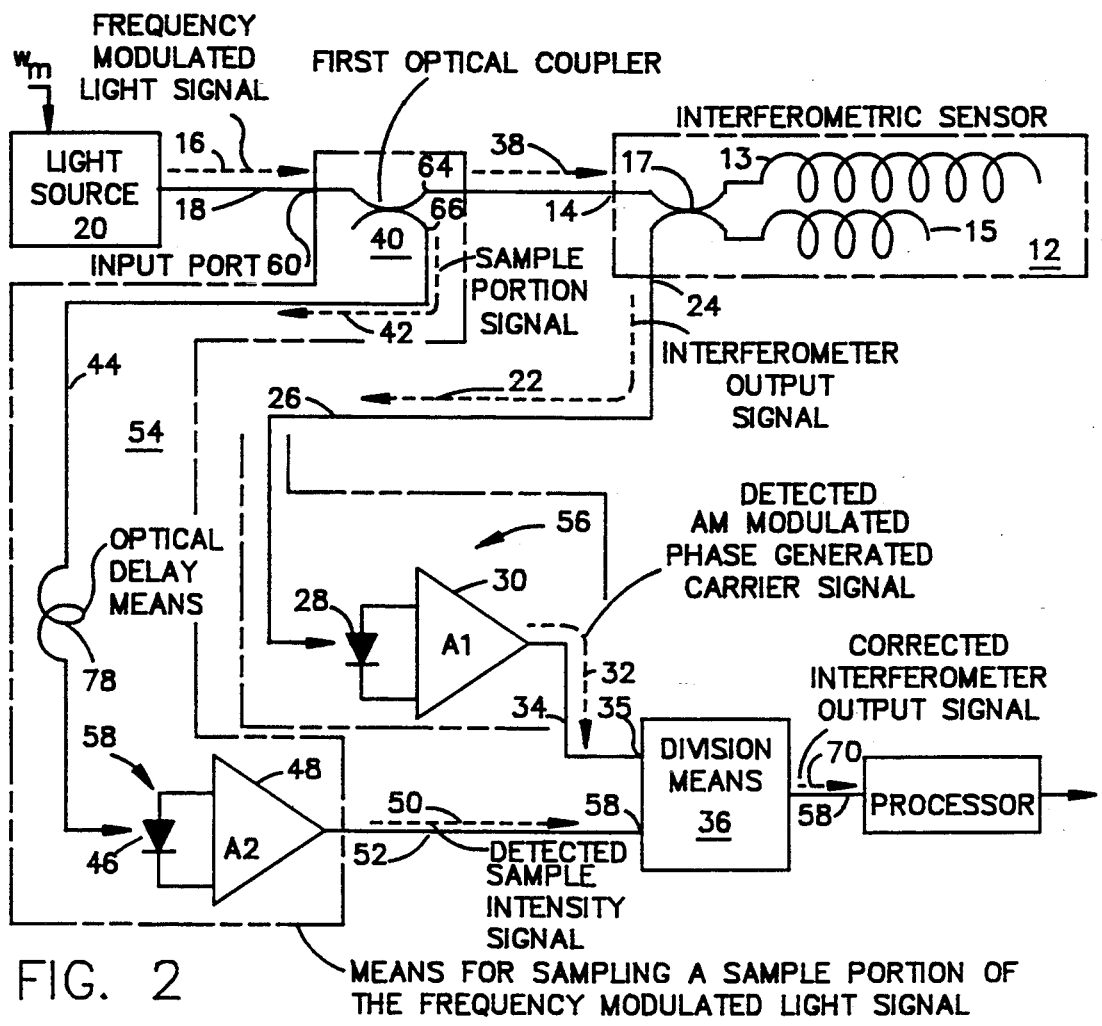
FIG. 2 is a schematic block diagram of a typical interferometer system for use in sensing hydrophone signals with elements for the LASER INTENSITY MODULATION REDUCTION CIRCUIT inserted therein.

FIG. 2 shows the typical interferometer apparatus of FIG. 1 with the interferometer amplitude modulation reduction circuit inserted therein and coupled to receive the interferometer output signal 22 from the interferometer output port 24 via optical waveguide or optical fiber 26 to detector 28. The first detector 28 responds to the interference pattern within the interferometer output signal to provide a detected interferometer output signal which is amplified by pre-amplifier A1, 30 to provide the detected AM modulated phase-generated carrier signal represented by ray 32 via conductor 34 to the first signal input 35 of division means 36.

The interferometric sensor 12 is excited by the frequency modulated input light signal represented by signal ray 38 from the light source 20 via optical coupler 40. As in FIG. 1, the laser light source 20 is frequency modulated by frequency modulated current input $w_m$. Optical coupler 40 is a broad band coupler that receives frequency modulated light signal 16 and couples or extracts a sample portion signal represented by ray 42 via optical fiber or optical wave guide 44 from the frequency modulated light signal 16 to a second detector 46 and pre-amplifier 48 which provides a detected sample intensity signal. The coupler is typically a lapped or fused bi-conical or integrated optics coupler characterized to pass 99% of the light from the source to the hydrophone input 14 and extract only 1 percent for use by the invention apparatus via sample portion signal 42.

The first and second detectors 28 and 46 are identically parts and are typically back biased pin diodes such as the FID13Z32TU by Fujitsu of Japan. The amplifiers 28 and 48 are typically transimpedance amplifiers that provide a change in output voltage in response to a change in current through the photo-diode D2 as it responds to the intensity changes of the interference pattern imposed on it.

The optical coupler 40 has at least an optical coupler input port 60 and first and second output ports 64, 66 respectively. The optical coupler input port 60 is coupled to receive the frequency modulated input light signal 16. The optical coupler couples a major portion of the frequency modulated input light signal 16 from the input port 60 to the first output port 64 and a small portion of the frequency modulated input light signal to the second output port 66 as the sample portion signal.

The sample portion signal 42 typically represents about 1% of the optical power in the frequency modulated light signal 16. Operation is expected to be satisfactory for an a sample portion signal 42 in the range of 0.01% to 50% of the signal power of the frequency modulated light signal 16, depending on the output power of the laser and the sensitivity of the preamp. The frequency modulated input light signal, represented by signal ray 38 is the remaining signal from the sampled frequency modulated light signal 16.

Amplifier 48 amplifies the detected sample portion signal from detector 46 and provides a detected sample intensity signal represented by ray 50 via conductor 52 to second signal input 58 of division means 36.

If the frequency modulated source 20 is a diode such as a laser diode, modulation is achieved by modulating the diode current which tends to introduce an unwanted amplitude modulation and intensity noise signal component onto the frequency modulated light signal 16. The unwanted amplitude modulation and intensity noise signal component present in the frequency modulated light signal 16 pass through the interferometric sensor 12 and is part of the interferometer output signal 22 and the detected AM modulated phase-generated carrier signal 32.

The invention interferometer amplitude modulation reduction apparatus provides an inexpensive means for eliminating a substantial portion of the effect of the unwanted amplitude modulation and intensity noise signal component present in the detected AM modulated phase-generated carrier signal 32.

The combination of the coupler 40, the detector 46 and the pre-amplifier 48 as coupled within phantom block 54 therefore represents one alternative embodiment of a sampling means 54 for sampling a sample portion of the frequency modulated light signal from the output of the light source 20 as a sample portion signal 42 and for detecting and converting the sample portion signal into a detected sample intensity signal 50 having a detected unwanted amplitude modulation and intensity noise signal component.

Detector 28 when coupled by optic fiber or wave guide 26 to receive and detect the interferometer output signal 22, and pre-amplifier 30 for amplifying the detected interferometer output signal form one alternative embodiment of a first detection means 56 for detecting the interferometer output signal from the output of the interferometric sensor 12 and for converting the interferometer output signal into a detected AM modulated phase-generated carrier signal 32 that contains a detected unwanted amplitude modulation and intensity noise signal component and a wanted interference induced intensity modulation interferometer output signal.

Division means 36 typically represents an analog divider circuit such as an AD734 JN by Analog Devices of Norwood, Mass. Division means 36 scales and divides the detected AM modulated phase-generated carrier signal by the detected sample intensity signal to provide a corrected interferometer output signal represented by ray 70 on output signal line 58. The detected unwanted amplitude modulation and intensity noise signal components common to both the detected sample intensity signal 50 and the detected AM modulated phase-generated carrier signal 32 substantially cancel each other by operation of the division process. The resulting corrected interferometer output signal 70 produced by division means 36 is substantially free of the detected unwanted amplitude modulation and intensity noise signal component.

Those skilled in the art will understand that if the detected AM modulated phase-generated carrier signal 32 and the detected sample intensity signal 50 are digitized into a series of sampled values with a frame rate frequency greater than several times the frequency of the FM modulation frequency, and if the successive sample values or frame values are then divided by a digital division process, the resulting stream of quotient values would have an envelope of magnitudes that is substantially free of the detected unwanted amplitude modulation and intensity noise signal component.

Referring again to FIG. 2, Equation 1 below characterizes an ideal form of the intensity I(t) of the frequency modulated light signal represented by ray 22 from an interferometer 12. An interferometer output with the form of equation 1 is possible only if the laser source 20 is capable of being frequency modulated without substantially influencing its output optical power. Equation 1 represents the output of a laser that has no "intensity" or AM modulation noise.

$$I(t) = A + B^* \cos[\Theta_m * \cos(w_m t + \alpha) + \phi(t) + n(t)] \quad \text{Equation 1.}$$

The term "A" is a constant that is related to the average intensity of light that is injected into the interferometer. The term "B" is an amplitude term that provides the range of variation or the excursion around the average value of the average intensity "A" that the intensity is varying due to the interference of the two beams in the sensor.

The $\cos(w_m t \ldots)$ term is a dimensionless FM (or PM) modulation frequency term. The $\cos(w_m t \ldots)$ term by itself is a cos function that modulates the intensity at a frequency of $w_m$ radians per second. The frequency of the $w_m$ term is typically in the tens to hundreds of thousands of radians per second. The alpha term is an angle representing an initial condition or some phase signal present at start up.

The $\phi(t)$ signal, within the $\cos(w_m t \ldots)$ term, is a phase signal term that contains the signal of interest. The $\phi(t)$ signal is caused by pressure or other external effects changing the length of the interferometer sensor arms. The $\phi(t)$ signal contains the information to be extracted from the interference pattern produced by the two beams of light coming back from the interferometer 12. The bandwidth of the $\phi(t)$ signal is typically in the low audio range extending up to a few tens of kilohertz.

The n(t) term is a noise term that includes laser phase noise and other phase noise sources.

$\Theta_m$ in Equation 1 is the peak phase modulation level. The $\Theta_m$ term is expressed in radians and multiplies the $\cos(w_m t + \alpha)$ term. The $\Theta_m$ angle defines the peak phase angle swing of the modulation term in radians with each cycle of phase modulation at frequency $w_m$.

Figure 7:
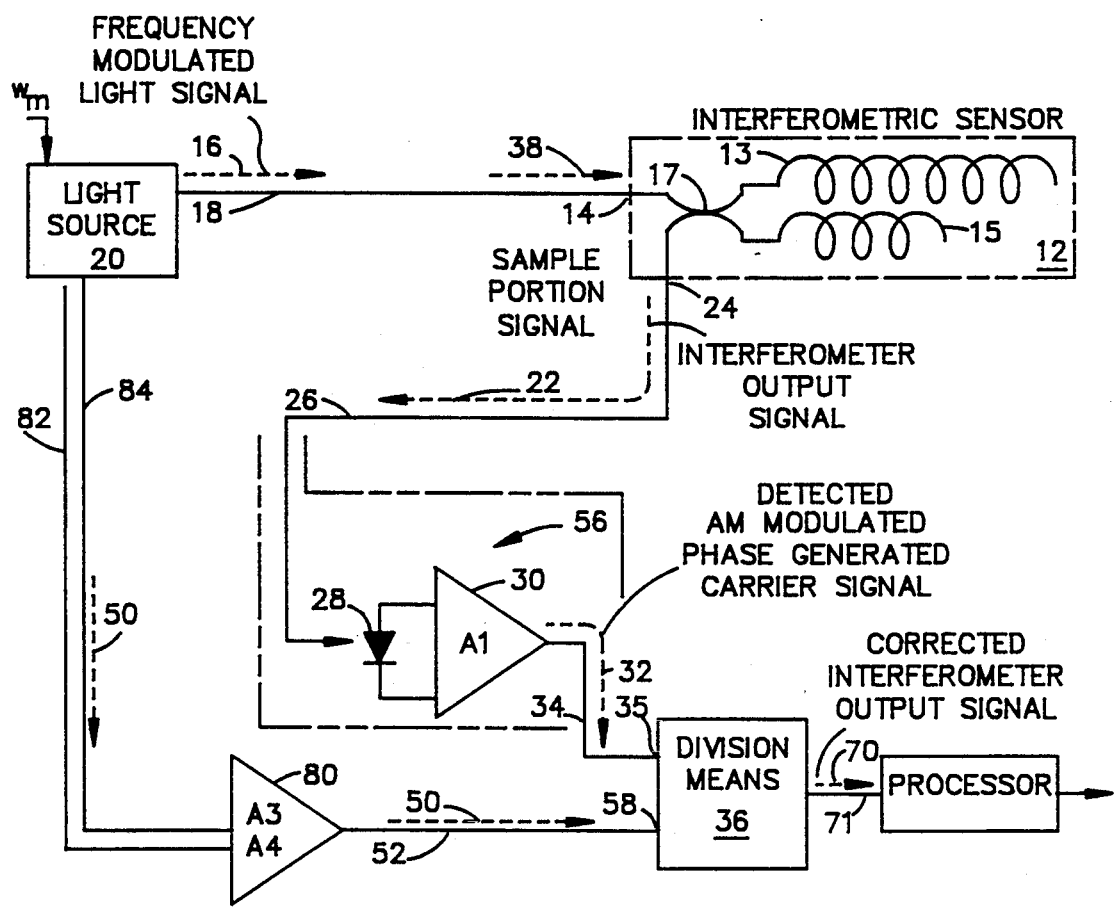
FIG. 7 is a schematic block diagram of a typical interferometer system for use in sensing hydrophone signals with elements for the LASER INTENSITY MODULATION REDUCTION APPARATUS inserted therein, the sampling means being assimilated into the light source.

In the ideal laser source driven system, Equation 1 defines the intensity of the light after it has been interfered. However, in a system, such as the arrangement of FIG. 7, that uses a laser diode, such as a DFB laser diode like the FLD130F2KP by Fujitsu of Japan is capable of providing a detected sample intensity signal 50 directly from the light source 20 to the division means second signal input 58 from its internal intensity detector (not shown). The combined function of A3 and A4 80 represents amplification for scaling, impedance buffering and delay for synchronization, as required by the division means selected for use. FIG. 7 also shows the elimination of the coupler 40 made possible by the use of a light source 20 with an embedded detector.

The current driving the laser source 20 is modulated to modulate the frequency of the light out of the laser diode. Shifting the frequency also has the effect of shifting the phase of the light out of the laser. As the laser source 20 is modulated at a frequency of $w_m$, for the purpose of changing its output frequency, the intensity of the light output of the laser also changes.

The preferred operating point of the drive current to the light source or laser diode by selecting an initial current level chosen to operate the source at a point of maximum change in output frequency with respect to a given change in drive current without substantial compromise of diode output power or phase noise.

Use of the subject invention permits the designer to select a value of drive current based on the optical output power or on low phase noise with reduced concern for related change in frequency versus change in output optical power. A typical drive current for the diode referenced above might be about 50 Ma when used with an interferometer having several hundreds of meters of single mode fiber. The actual value used would depend on the diode selected and characteristics of the interferometer to be driven.

A variation in the intensity of the light output of the laser source 20 is referred to as an unwanted AM (amplitude modulation) and intensity noise signal component. AM modulation is undesirable. The use of an EO (electro-optic modulator) or an AO (acousto-optic modulator), or multi-electrode lasers would reduce the problem but would increase complexity and cost of the frequency modulated light source.

Equation 2 below characterizes the output intensity of the interferometer output signal at ray 22 when the light source 20 that is used is a laser diode, such as a DFB laser diode, and the drive current is modulated to produce frequency modulation. The $(1+C^* \cos w_m t)$ term represents an unwanted AM modulation term. The detected AM modulated phase-generated carrier signal 32 is of the form. "C" is a constant that defines how much AM modulation that you get. The value of C can be any number but will typically be a number between 0 and 1.

$$I(t) = n_i(t)*(1 + C^* \cos w_m t)*(A + B^* \cos [\Theta_m * \cos (w_m t + \alpha) + \Phi(t) + n(t)])$$ Equation 2.

Equation 3 contains the intensity modulation term F(t) and the Intensity Noise term $n_i(t)$. The invention apparatus removes both the intensity noise and the intensity modulation.

The invention apparatus obtains a sample portion 42 of the output of the laser diode for the purpose of monitoring the unwanted AM component of information. The sample portion signal ray 22 does not pass through the interferometer so the interference fringe pattern that is present on first detector 28 is not present on second detector 46. The detected sample intensity signal 50 has no interference information but does preserve the unwanted amplitude modulation and intensity noise information expressed here as equation 3.

$$F(t) = (1 + C^* \cos w_m t)*n_i(t)$$ Equation 3.

The division means 36 divides the electrical signal of the form of equation 2 by a signal having the form of equation 3 thereby canceling the effect of the unwanted amplitude modulation component $(1+C^* \cos w_m t)$ and the intensity noise component, $n_i(t)$, thereby providing the corrected interferometer output signal 70 substantially free of the effect of unwanted amplitude modulation and intensity noise.

Figure 3:
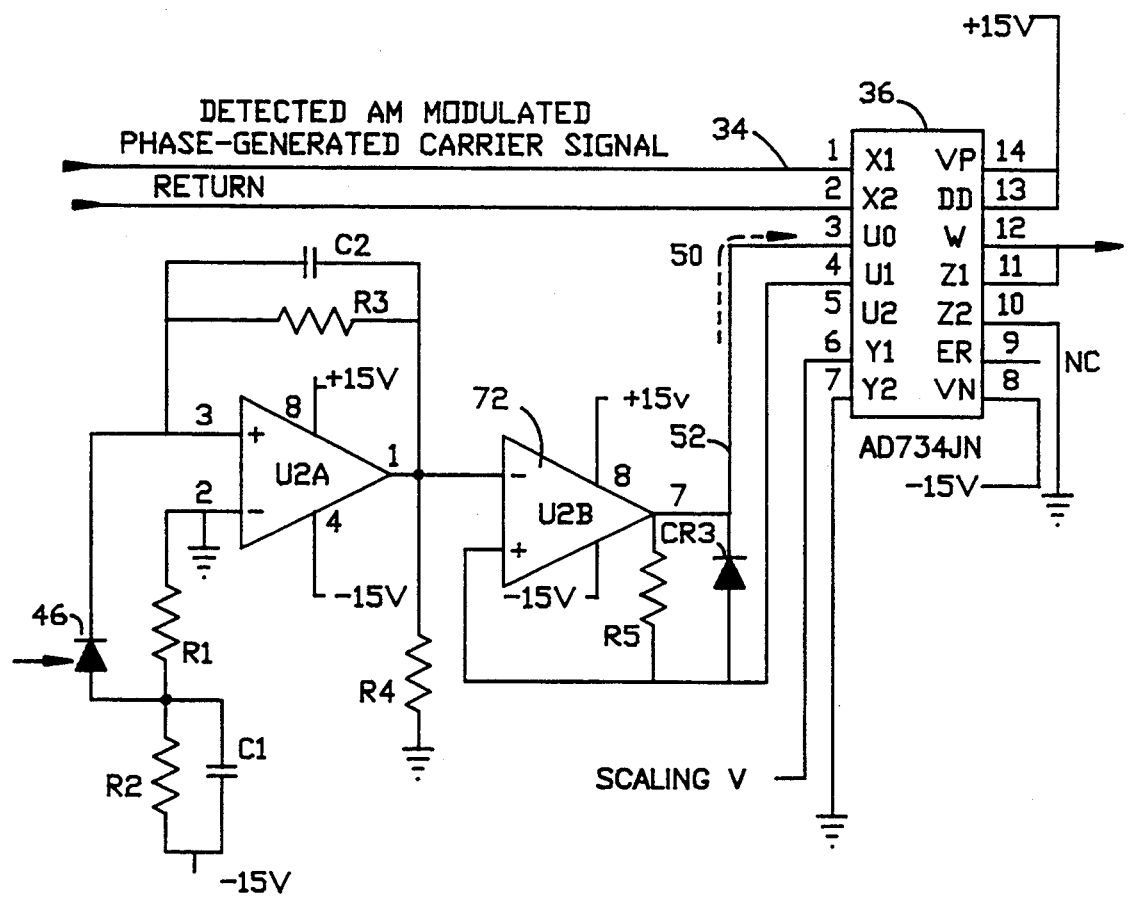
FIG. 3 is a schematic diagram of an AM elimination circuit means.

FIG. 3 is an expanded view of the photo-detector 46 and preamplified 48 wherein the amplifier A2, a means for sampling a sample portion of the frequency modulated light signal, is formed by the detector 46, receiving a delayed sample portion signal. The circuit of U2A provides a bias for detector 46 via resistor R1, R2 and C1. Capacitor C1 is typically a small ceramic capacitor for high frequency noise suppression. The detector is typically a PIN diode that is back biased to a voltage value established by the voltage divider R1, R2. The amplifier will adjust its output voltage to insure that the voltage at pin 3 of U2A remains at or very near zero volts as light impinges on the detector, and the detector 46 generates small currents in response to changes in intensity. Amplifier 72 is a non-inverting unity gain follower used to buffer the amplified detected sample intensity signal 50 via conductor 52 into pin 3, the second signal input for the denominator, of divider 36.

Referring again to FIG. 2, optical fiber 78 represents an optical delay means coupled to receive the sample portion signal 42. Optical fiber 78 has a length that is predetermined or adjusted to delay the unwanted amplitude modulation and intensity noise signal component present in the sample portion signal 42. The length of or coil of fiber operates as a delay line to provide a delay or phase shifting function.

The delay line of fiber 78 is adjusted in length to move the signal forward or backward in time sufficient to synchronize the unwanted amplitude modulation and intensity noise signal component with the unwanted amplitude modulation and intensity noise signal component present in the detected AM modulated phase-generated carrier signal 32 to obtain substantial cancellation of the corresponding unwanted amplitude modulation and intensity noise signal components as they are concurrently processed by the division means.

Figure 4:
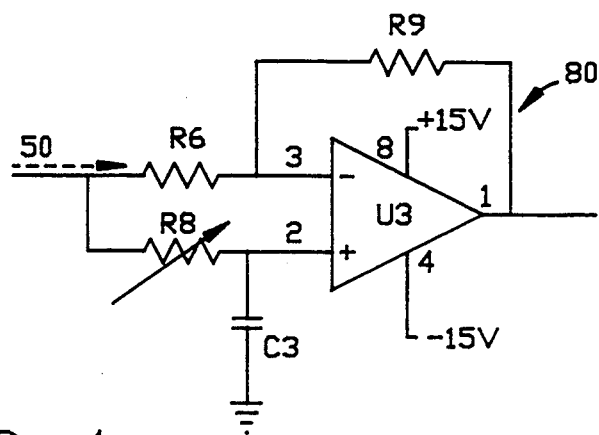
FIG. 4 is a schematic diagram of an electrical delay circuit means using a single pole delay circuit.

FIG. 4 shows a phase shifter circuit 76 that operates as an alternative delay means to the optical fiber 78. The phase shifter circuit serves as an electrical delay means 80 responsive to the detected sample intensity signal 50 for delaying the unwanted amplitude modulation and intensity noise signal component present in the sample portion signal 42 for a time sufficient to synchronize it with the unwanted amplitude modulation and intensity noise signal component present in the detected AM modulated phase-generated carrier signal 32. Synchronization obtains substantial cancellation of the corresponding unwanted amplitude modulation and intensity noise signal components as they are concurrently processed by the division means 36.

Figure 5:
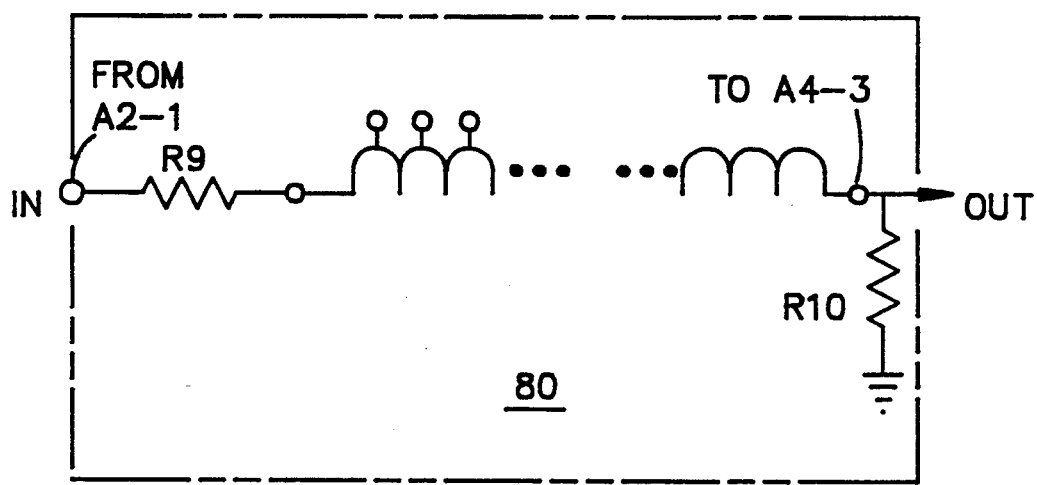
FIG. 5 is an embodiment of an electrical delay circuit means using a delay line with an input, an output and taps for sensing the input signal delayed for intervals less than the maximum delay at the output.

FIG. 5 shows the electrical delay means within phantom box 80. The phase shifter circuit 80 is inserted into second pre-amplifier 48. The phase shifter is adjusted to match the phase of the unwanted amplitude modulation signal component at division means first input 35 with the unwanted amplitude modulation signal component at division means second input 58.

In the alternative delay means of FIG. 5, the active phase shifter circuit 80 is inserted into the pre-amplifier circuit 48 at pin 1 of A2 and drives the non-inverting input of follower A4. The amplifier for the phase shifter circuit would typically be a conventional op amp such as a TL 072.

The pot R8 is then adjusted to obtain a match of the phase of the interferometer output signal at pin 1 of the division mean 36 with the signal at pin 3 of the division means 36. The phase shift circuit of 80 is typically able to provide a phase shift about 0–90 degrees for a carrier modulated at 100 Khz.

Referring to FIG. 4, R8 and C3 form an RC delay circuit which provides a transfer function of 1/R8C3*(s+1/R8C3). The output at pin 1 of U3 will be equal to the input detected sample intensity signal 50 times a gain equal to −R7/R8. The output is inverting with a single pole at 1/R8C3 radians per second. The disadvantage associated with this circuit is that it provides delay that varies with frequency or wavelength. A broad band signal experiences a loss in fidelity as a result of this property.

Figure 6:
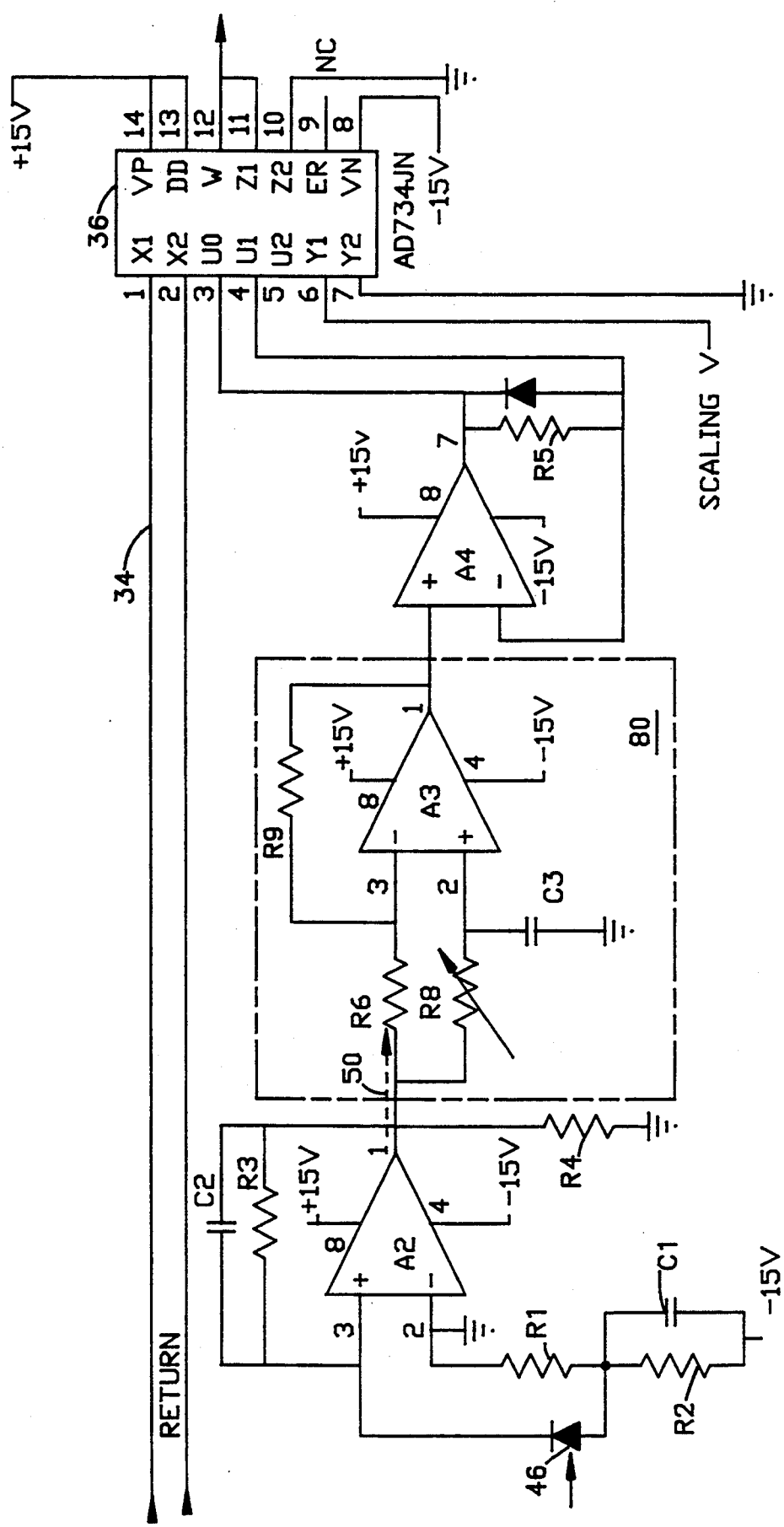
FIG. 6 is a schematic diagram of a LASER INTENSITY MODULATION REDUCTION APPARATUS with an electrical delay circuit means inserted therein.

FIG. 5 is a true delay lines and provide a solution to the problem posed by the circuit of FIG. 4. The delay line of FIG. 5 is might typically be similar to a LCB01KZ100 supplied by Allen Avionics of Mineola, N.Y., USA. A delay line, when used in place of the electrical delay means 80, shown in FIG. 6, provides a true delay over a broad band of frequencies thereby preserving amplitude fidelity.

Use of the invention apparatus will depend on the laser diode that is used and other factors as well. Because of the relatively high levels of phase modulation required by most systems, circuits using a laser diode can easily experience 50 to 100 percent amplitude modulation that will destroy the signal of interest. Use of the apparatus essentially reduces the effect of the AM noise to substantially zero. A reduction in AM modulation to a range of 0–5 percent is typically possible.

Operation of the detector circuit shown in British patent 2,209,221 titled "Hydrophone Demodulator Circuit and Method" issued Oct. 23, 1991 requires that the phase modulation index $\Theta m$ be held constant. The phase modulation index controller circuit of U.S. patent application Ser. No. 07/751,358, filed Aug. 19, 1991 for an "Interferometer Phase Modulation Controller", and which issued as U.S. Pat. No. 5,283,625 on Feb. 1, 1994 to J. S. Bunn, does this by monitoring the ratio modulation frequency harmonics. The controller circuit adjusts the modulation index to obtain predetermined ratios of harmonic contents in accordance with predetermined bezel weight.

If the signal from the interferometer has AM disturbances present, the unwanted AM modulation signals will be present on top of the harmonics that are being monitored. The bezel weighted frequency signals will be artificially large or small in response to the AM present. The unwanted AM signal component will therefore change the apparent modulation index as seen by the phase modulation controller resulting in a net output error. It is apparent that use of the invention modulation reduction circuit will provide a substantial advantage if used in combination with the "Interferometer Phase Modulation Controller" apparatus of U.S. patent application Ser. No. 07/751,385.

FIG. 7 shows an alternative to the sampling means 54 that is depicted in FIG. 2. The alternative sampling means of FIG. 7 eliminates the necessity for the first optical coupler 40 by using a light source 20 that contains a sampling diode within light source 20. Signal lines 82 and 84 carry the detected sample intensity signal. In yet another alternative embodiment, the pre-amplifier circuit, such as that of U2A in FIG. 3 and the follower circuit of U2B are incorporated into the light source 20 package along with the detector 48. The delay means 80 depicted in FIG. 6 is accommodated internal to or external to the light source 20 package as design and adjustment requires.

Figures 8, 8A:
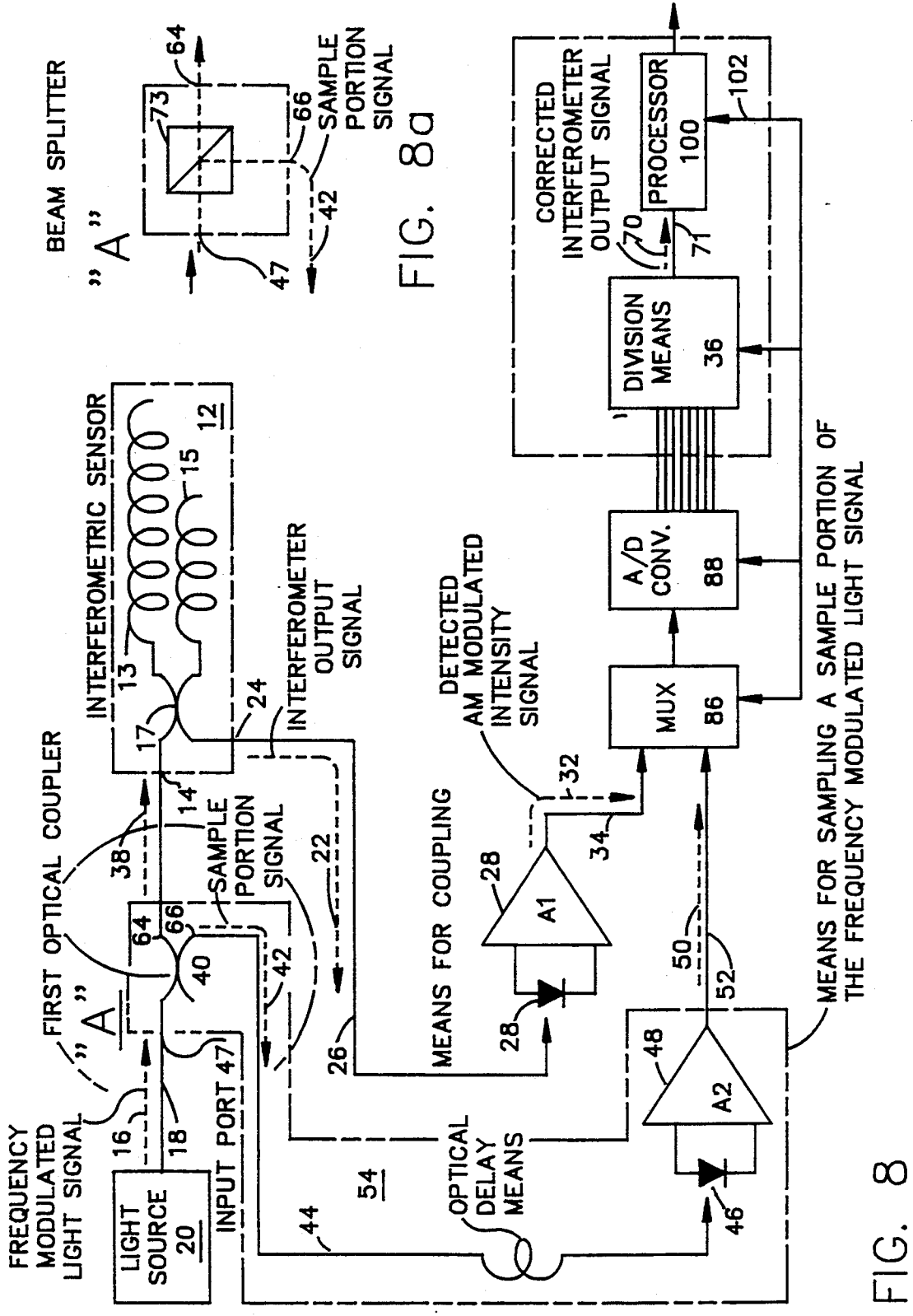
FIG. 8 is a schematic diagram of an alternative embodiment of the amplitude modulation reduction apparatus in which the detected AM modulated phase-generated carrier signal and the detected sample intensity signal are periodically multiplexed and sampled and converted to digital values, the corresponding digital values being divided digitally to provide a corrected digital interferometer output signal.
FIG. 8a is an insert Figure that depicts the alternate use of a BEAM SPLITTER within the region of FIG. 8 captured by the broken phantom circle "A"

FIG. 8 is a schematic diagram of an alternative embodiment of the amplitude modulation reduction apparatus in which the detected AM modulated phase-generated carrier signal 32 and the detected sample intensity signal 50 are periodically multiplexed and sampled by MUX 86 and converted to digital values by Analog-to-Digital Converter 88. The corresponding digital values are divided digitally by a digital division means 36 to provide a stream of corrected digital interferometer output signals substantially free of amplitude modulation. All though digital division means 36 us shown as a separate functional block, it should be understood that the division process would be accommodated within the processor.

The conversion multiplexing process by MUX 86, the Analog-to-digital conversion process and transfer to the digital division means 36 is synchronized by a clock signal or sync signal from a clock circuit (not shown) via sync bus 102, or from a synchronizing signal from a processor such as processor 100 via sync bus 102. The processor receives the stream of corrected digital interferometer output signals 70 via bus 71.

FIG. 8a is an alternative arrangement that shows a BEAM SPLITTER, 73 used for the coupling means performed by the coupler 40 within the area designated as "A" that is captured by the phantom circle in FIG. 8.

Figure 9:
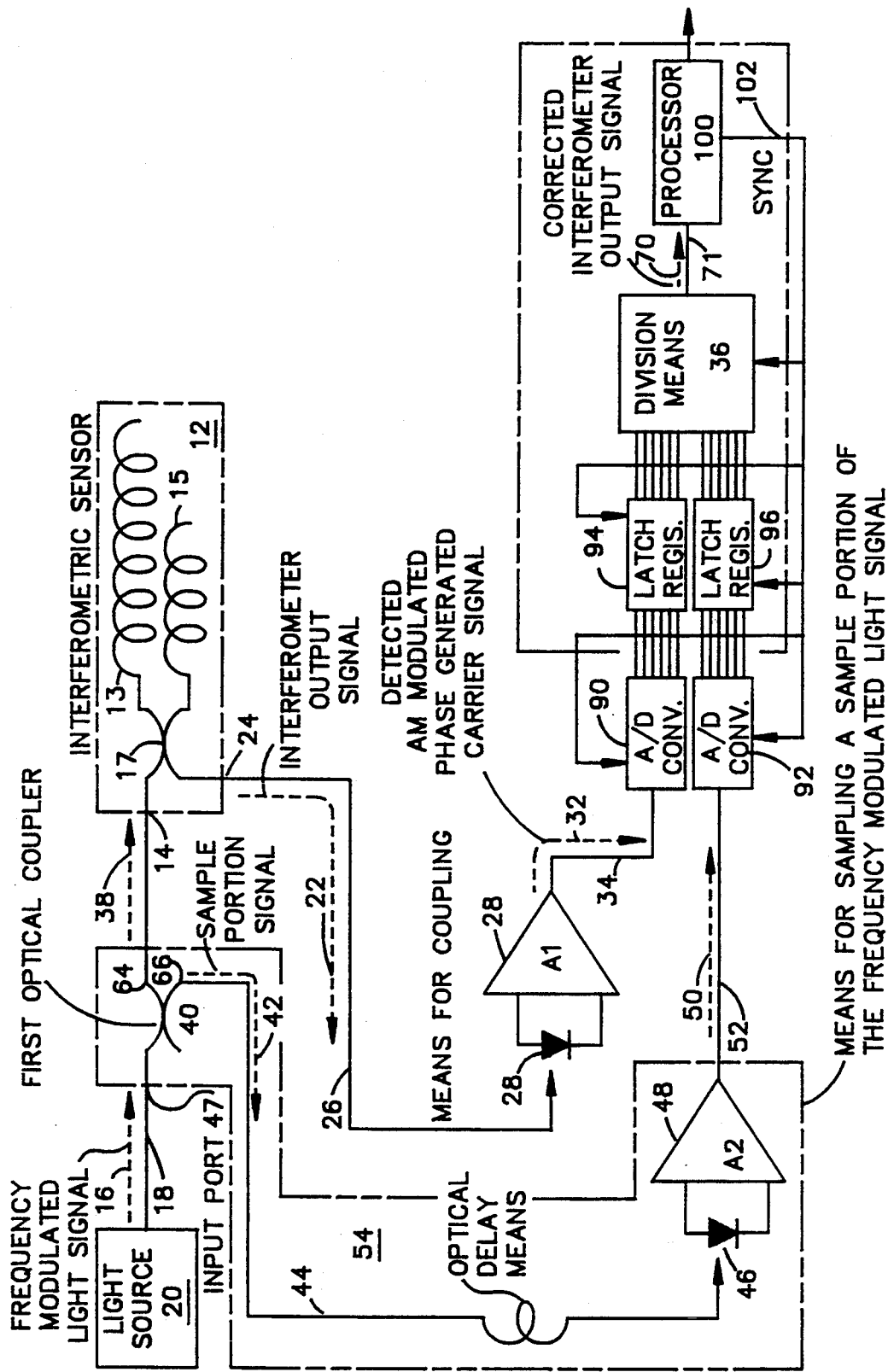
FIG. 9 is a schematic diagram of another alternative embodiment of the amplitude modulation reduction apparatus in which the detected AM modulated phase-generated carrier signal and the detected sample intensity signal are periodically sampled and converted to digital values, the corresponding digital values being divided digitally to provide a corrected digital interferometer output signal.

FIG. 9 is a schematic diagram of another alternative embodiment of the amplitude modulation reduction apparatus in which the detected AM modulated phase-generated carrier signal 32 and the detected sample intensity signal 50 are periodically sampled and converted to digital values by Analog-to-Digital Converters 90, 92. The corresponding digital values stored in latch registers or other memory means 94, 96 for use by digital division by division means 36. The conversion process, storage process and transfer to the digital division means 36 is synchronized by a clock signal or sync signal from a clock circuit or from synchronizing signal from a processor such as processor 100 via sync bus 102. The processor receives the stream of corrected digital interferometer output signals 70 via bus 71.

The above-described embodiments are furnished as illustrative of the principles of the invention, and are not intended to define the only embodiment possible in accordance with our teaching. Rather, the invention is to be considered as encompassing not only the specific embodiments shown, but also any others falling within the scope of the following claims.

I claim:

1. An interferometer amplitude modulation reduction apparatus coupled to receive an interferometer output signal from the output of a fiber optic interferometer-sensor, the fiber optic interferometer sensor being excited by a frequency modulated input light signal from a light source having an unwanted amplitude modulation and intensity noise signal component, the interferometer output signal having wanted interference induced intensity modulation and unwanted amplitude modulation and intensity noise from the unwanted amplitude modulation and intensity noise signal component present on the frequency modulated input light signal, the apparatus comprising:
- a fiber optic interferometer having a sense arm responsive to a physical disturbance and a reference arm, the fiber optic interferometer having an optical input for receiving the frequency modulated input light signal and an interferometer output port for providing an interferometer output signal;
- sampling apparatus coupled to receive a sample portion of the frequency modulated input light signal from the output of the light source as a sample portion signal and for detecting and converting the sample portion signal into an electrical detected sample intensity signal having a detected unwanted amplitude modulation and intensity noise signal component,
- a first detector coupled to optically receive the interferometer output signal from the output of the fiber optic interferometer sensor and for converting the interferometer output signal into an electrical detected AM modulated phase-generated carrier signal containing a detected unwanted amplitude modulation and intensity noise signal component; and,
- a divider coupled to scale and divide the detected AM modulated phase-generated carrier signal by the detected sample intensity signal to provide a corrected interferometer output signal;
- whereby, the detected unwanted amplitude modulation and intensity noise signal components common to both the detected sample intensity signal and the detected AM modulated phase-generated carrier signal are substantially canceled by the division process.

2. The apparatus of claim 1 wherein the sampling apparatus comprises:
- an optical coupler having at least an input port and first and second output ports, the input port being coupled to receive the frequency modulated input light signal, the optical coupler coupling a major portion of the frequency modulated input light signal from the input port to the first output port and a small portion of the frequency modulated input light signal to the second output port as the sample portion signal;
- a second detector coupled to receive the sample portion signal and for converting the sample portion signal into the detected sample intensity signal.

3. The apparatus of claim 1 wherein the light source is a laser light source.

4. The apparatus of claim 3 wherein the laser light source is a solid state laser light source.

5. The apparatus of claim 2 wherein the sample apparatus further comprises:
- a delay means responsive to the sample portion signal for delaying the unwanted amplitude modulation and intensity noise signal component present in the sample portion signal for a time sufficient to synchronize it with the unwanted amplitude modulation and intensity noise signal component present in the detected AM modulated phase-generated carrier signal to obtain substantial cancellation of the corresponding unwanted amplitude modulation and intensity noise signal components as they are concurrently processed by the division means.

6. The apparatus of claim 5 wherein the delay means responsive to the sample portion signal further comprises:
- optical delay means responsive to the sample portion signal for delaying the unwanted amplitude modulation and intensity noise signal component present in the sample portion signal by a predetermined time interval selected to synchronize it with the unwanted amplitude modulation and intensity noise signal component present in the detected AM modulated phase-generated carrier signal to obtain substantial cancellation of the corresponding unwanted amplitude modulation and intensity noise signal components as they are concurrently processed by the division means.

7. The apparatus of claim 5 wherein the delay means responsive to the sample portion signal further comprises:
- electrical delay means responsive to the detected sample intensity signal for delaying the unwanted amplitude modulation and intensity noise signal component present in the sample portion signal for a time sufficient to synchronize it with the unwanted amplitude modulation and intensity noise signal component present in the detected AM modulated phase-generated carrier signal to obtain substantial cancellation of the corresponding unwanted amplitude modulation and intensity noise signal components as they are concurrently processed by the division means.

8. The apparatus of claim 2 wherein the divider further comprises:
- a delay responsive to the detected sample intensity signal for delaying the unwanted amplitude modulation and intensity noise signal component present in the detected sample intensity signal for a time sufficient to synchronize it with the detected unwanted amplitude modulation and intensity noise signal component present in the detected AM modulated phase-generated carrier signal and to provide a synchronized detected sample intensity signal; and
- an integrated circuit divider coupled to divide the detected AM modulated phase-generated carrier signal by the synchronized detected sample intensity signal to provide the corrected interferometer output signal.

9. A frequency modulated interferometer signal detection system with reduced signal amplitude modulation and signal intensity noise comprising:
- a light source for providing a frequency modulated light signal having an unwanted amplitude modulation and intensity noise signal component,
- a fiber optic interferometer sensor having a sense arm responsive to a physical disturbance, a reference arm, an input port for receiving the frequency modulated input light signal and an output port for providing an interferometer output signal and at least a first interferometer optical coupler for optically connecting the sense arm and reference arm to the input and output ports;
- the interferometer output signal having wanted interference induced intensity modulation and unwanted amplitude modulation and intensity noise from the unwanted amplitude modulation and intensity noise signal component present on the frequency modulated input light signal, coupling means having at least an input port and first and second output ports, the input port being coupled to receive the frequency modulated input light signal, the optical coupler coupling a major portion of the frequency modulated input light signal from the input port to the first output port and a small portion of the frequency modulated input light signal to the second output port as the sample portion signal;

first detection means for detecting the interferometer output signal from the output of the fiber optic interferometer sensor and for converting the interferometer output signal into a detected AM modulated phase-generated carrier signal containing a detected unwanted amplitude modulation and intensity noise signal component; and, second detector means coupled to receive the sample portion signal and for converting the sample portion signal into a detected sample intensity signal;

division means having a first signal input coupled to receive the detected AM modulated phase-generated carrier signal and for scaling and dividing the detected AM modulated phase-generated carrier signal by the detected sample intensity signal to provide a corrected interferometer output signal;

whereby, the detected unwanted amplitude modulation and intensity noise signal components common to both the detected sample intensity signal and the detected AM modulated phase-generated carrier signal are substantially canceled by the division process, the corrected interferometer output signal being substantially free of the detected unwanted amplitude modulation and intensity noise signal component.

10. The apparatus of claim 9 wherein the light source is a laser light source.

11. The apparatus of claim 9 wherein the laser light source of is a solid state laser light source.

12. The apparatus of claim 9 wherein the coupling means having at least an input port and first and second output ports further comprises a beam splitter.

13. The apparatus of claim 9 wherein the coupling means having at least an input port and first and second output ports further comprises an optical coupler.

14. The apparatus of claim 9 wherein the coupling means having at least an input port and first and second output ports further comprises:

an optical coupler coupled to receive the frequency modulated light signal from the light source and for providing a frequency modulated input light signal to the interferometer input port and for providing the sample portion signal;

and wherein, an optical delay means responsive to the sample portion signal for delaying the unwanted amplitude modulation and intensity noise signal component present in the sample portion signal for a time sufficient to synchronize it with the unwanted amplitude modulation and intensity noise signal component present in the detected AM modulated phase-generated carrier signal to obtain substantial cancellation of the corresponding unwanted amplitude modulation and intensity noise signal components as they are concurrently processed by the division means.

15. The apparatus of claim 9 wherein the second detector means coupled to receive the sample portion signal and for converting the sample portion signal into the detected sample intensity signal;

further comprises:

an electrical delay means responsive to the detected sample intensity signal from the second detector for delaying the unwanted amplitude modulation and intensity noise signal component present in the sample portion signal for a time sufficient to synchronize it with the unwanted amplitude modulation and intensity noise signal component present in the detected AM modulated phase-generated carrier signal and for providing the delayed detected sample intensity signal to the division means second input to obtain substantial cancellation of the corresponding unwanted amplitude modulation and intensity noise signal components as they are concurrently processed by the division means.

16. The apparatus of claim 9 wherein the division means further comprises an analog divider integrated circuit.

17. An interferometer amplitude modulation reduction apparatus comprising:

a fiber optic interferometer sensor, the fiber optic interferometer sensor being responsive to a physical disturbance and excited by a frequency modulated input light signal from a light source having an unwanted amplitude modulation and intensity noise signal component, the apparatus a sampling circuit for sampling a sample portion of the frequency modulated input light signal from the output of the light source as a sample portion signal and for detecting and converting the sample portion signal into a detected sample intensity signal having a detected unwanted amplitude modulation and intensity noise signal component, a detector and scaling circuit for detecting the interferometer output signal from the output of the fiber optic interferometer sensor and for converting the interferometer output signal into a detected AM modulated phase-generated carrier signal containing a detected unwanted amplitude modulation and intensity noise signal component; and, division circuit for scaling and dividing the detected AM modulated phase-generated carrier signal by the detected sample intensity signal to provide a corrected interferometer output signal, the corrected interferometer output signal being substantially free of the detected unwanted amplitude modulation and intensity noise signal component.

18. The interferometer amplitude modulation reduction apparatus of claim 17 where in the sampling circuit further comprises a portion of the light source, the portion of the light source having an embedded detector for directly sampling the frequency modulated light signal and for providing the detected sample intensity signal having a detected unwanted amplitude modulation and intensity noise signal component to the division circuit.

19. An interferometer amplitude modulation reduction method for receiving an interferometer output signal from the output of a fiber optic interferometer sensor, the fiber optic interferometer sensor having a sense arm responsive to a physical disturbance, a reference arm, and at least a first optical coupler for optically connecting the sense arm and reference arm to an input port and an output port, the input port being excited by a frequency modulated input light signal from a light source having an unwanted amplitude modulation and intensity noise signal component, the method comprising the steps of:

sampling a sample portion of the frequency modulated input light signal from the output of the light source as a sample portion signal and detecting and converting the sample portion signal into a detected sample intensity signal having a detected unwanted amplitude modulation and intensity noise signal component, detecting the interferometer output signal from the output port of the fiber optic interferometer sensor and converting the interferometer output signal into a detected AM modulated phase-generated carrier signal containing a detected unwanted amplitude modulation and intensity noise signal component; and, dividing and scaling the detected AM modulated phase-generated carrier signal by the detected sample intensity signal to provide a corrected interferometer output signal.

20. The interferometer amplitude modulation reduction method of claim 19 where in the sampling step further comprises:

sampling and detecting the frequency modulated light signal at the light source and providing the detected sample intensity signal having a detected unwanted amplitude modulation and intensity noise signal component to the division circuit.

* * * * *